United States Patent [19]

Budnicki et al.

[11] Patent Number: 4,476,840

[45] Date of Patent: Oct. 16, 1984

[54] EVAPORATION CHAMBER FOR FUEL DELIVERY SYSTEMS

[76] Inventors: Xavier B. Budnicki, Edison, N.J.; Barbara A. Budnicki, executrix, 117 Livingston Ave., Edison, N.J. 08817

[21] Appl. No.: 385,071

[22] Filed: Jun. 4, 1982

[51] Int. Cl.³ .............................................. F02M 31/00
[52] U.S. Cl. ..................................... 123/557; 123/558; 123/523
[58] Field of Search ................... 123/557, 558, 3, 523, 123/522, 524, 525; 261/144, 145, 98

[56] References Cited

U.S. PATENT DOCUMENTS

| | | | |
|---|---|---|---|
| 1,292,653 | 1/1919 | Saul | 123/557 |
| 1,950,806 | 3/1934 | Mathes | 123/557 |
| 1,980,496 | 11/1934 | Musselwhite | 123/557 |
| 2,247,181 | 6/1941 | Berhouder | 123/548 |
| 2,295,209 | 9/1942 | Guiles | 123/3 |
| 3,201,934 | 8/1965 | Smith | 123/557 |
| 3,447,511 | 6/1969 | Beard | 123/557 |
| 3,855,980 | 12/1974 | Weisz | 123/557 |
| 4,089,314 | 5/1978 | Bernecker | 123/557 |
| 4,306,531 | 12/1981 | Watkins | 123/557 |

Primary Examiner—Richard H. Lazarus
Attorney, Agent, or Firm—Arthur L. Plevy

[57] ABSTRACT

There is disclosed an evaporation chamber for converting liquid fuel to a gaseous state prior to introducing the fuel into the carburetor. The evaporation chamber consists of an outer housing and an inner housing. The inner housing is in thermal contact with the outer housing and contains a network consisting of a stacking of steel turnings which produces a sponge like surface. Exhaust gas from the engine are introduced into an inlet port which communicates with the outer housing to heat the fuel which is injected into the inner housing.

1 Claim, 1 Drawing Figure

U.S. Patent
Oct. 16, 1984
4,476,840
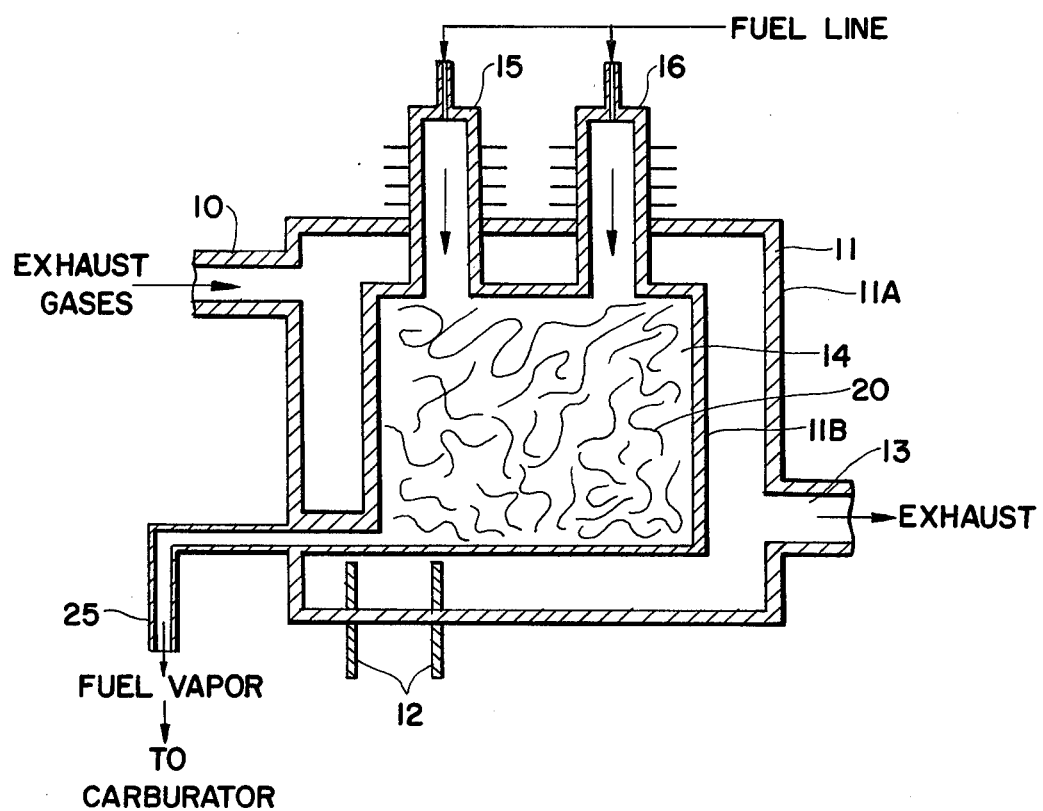

EVAPORATION CHAMBER FOR FUEL DELIVERY SYSTEMS

BACKGROUND OF INVENTION

This invention relates to a fuel system particularly adapted for internal combustion engines and more particularly to an improved evaporation chamber for use in a fuel control system.

In U.S. Pat. No. 4,223,652 which issued on Sept. 23, 1980 and entitled Fuel Delivery Systems by Xavier B. Budnicki, there is disclosed a system which employs an evaporation chamber. In this system the evaporation chamber is used to preheat the fuel by means of exhaust gases. This is done prior to injection of the fuel into the carburetor of an automobile. The patent explains in detail the benefits of doing this and also contains explanations of prior art patents which also attempt to vaporize the fuel prior to injection of the fuel into the carburetor of the automobile. The vaporization of fuel provides for an improvement in efficiency of the engine and further serves to reduce the number and amount of pollutants emitted by the engine.

In any event, there is a need to provide an improved evaporation chamber which will assure that the fuel is completely vaporized and hence the liquid fuel is converted from a liquid to a gaseous state.

It is therefore an object of the present invention to provide an improved combustion chamber which effectively operates to assure the complete vaporization of fuel.

DESCRIPTION OF THE PREFERRED EMBODIMENT

An improved evaporation chamber for a fuel system in an internal combustion engine for vaporizing fuel prior to introduction of the same into the carburetor, by heating the fuel with engine exhaust gases, comprising an outer hollow housing having an inlet port for receiving exhaust gases and an output port for discharging said exhaust gases, an inner hollow housing located in the hollow of said outer housing and in thermal contact therewith, said inner housing containing a stacked array of heat conductive turnings within said hollow to provide a sponge like mesh and input means for introducing fuel within the hollow of said inner chamber and output means for directing vaporized fuel to the carburetor of said engine.

BRIEF DESCRIPTION OF THE FIGURE

The sole FIGURE is a cross-sectional view of an evaporation chamber according to this invention.

DETAILED DESCRIPTION OF THE INVENTION

The evaporation chamber is depicted in the FIGURE. Exhaust gases from the vehicle, which gases are those normally discharged are directed through suitable tubing into an inlet port 10 of the chamber where they serve to heat the housing 11. Essentially, the housing consists of an outer shell 11A and an inner shell or housing 11B. The inlet port 10 communicates with an outlet port 13 and allows exhaust gases to entirely circulate about the periphery of the inner chamber 11B. In this manner, the inlet port is positioned on one side of the outer chamber 11A near the top thereof, while the outlet port 13 is positioned on the other side of the outer chamber 11A near the bottom portion. This positioning of the inlet and outlet ports 10 and 13 creates turbulence which allows exhaust gases to circulate completely above the periphery of the inner chamber 11B to provide a maximum heat transfer. The housings are fabricated from a metal and are thermally connected together by the associated walls. The outer housing 11A as indicated is fabricated from a good conductive metal and may include a plurality of fins such as 12, located on the inner and outer surfaces to obtain a greater heat transfer. The outer housing 11A receives exhaust gas at inlet port 10 and discharges the exhaust gas at outlet port 13. In this manner, the outlet port 13 is connected to the exhaust pipe of the automobile where the exhaust gases are eliminated in a conventional manner.

Coupled to the inner housing 11B via the fuel line of the automobile are two solenoid valves 15 and 16. The fuel is introduced into the central chamber 11B by means of the valves 15 and 16 which are fuel injectors. The fuel injectors or valves 15 and 16 are conventional and are found in many conventional automobiles. The inside 14 of the inner chamber 11B comprises a network of stainless steel turnings 20. This network of steel turnings provides an inner area within the chamber of a sponge like mesh array which gives the fuel many surfaces to impinge upon and which array completely avoids fragmentation of the fuel.

While stainless steel is preferable other nonporous heat, transmitting matter could be employed. However, it is desirable that a good conductive metal be utilized. Thus the inner chamber 11B may be machined or may actually contain steel scraps or turnings which are introduced into the inner chamber 11B and stacked therein.

In prior art evaporation chambers liquid fuel does not immediately evaporate but tends to fragment. This fragmentation is due to the fact that the fuel does not vaporize immediately when striking a planar surface. In the heat exchanger shown in the FIGURE, the network of steel turnings 20 offers many paths upon which the fuel strikes. In this manner, the liquid fuel is efficiently converted to a gaseous state before introduction into the carburetor of the engine via the fuel output line 25.

The fuel emanating from line 25 is gravity fed into the carburetor and therefore allows the carburetor of the engine to work in an efficient manner as disclosed and described in the above noted patent. The evaporation chamber shown has many advantages that since the fuel is completely evaporated or changed to a gaseous state the carburetor can operate with all types of fuel such as wood alcohol, diesel fuel, as well as other combustionable materials.

It is therefore indicated that this apparatus offers a more efficient technique of vaporizing fuel prior to injection of the same into the carburetor in the internal combustion engine.

What is claimed is:

1. An improved evaporation chamber for a fuel system in an internal combustion engine for vaporizing fuel prior to introduction of the same into the carburetor, by heating the fuel with engine exhaust gases, comprising:

an outer hollow housing having an inlet port for receiving exhaust gases and an output port for discharging said exhaust gases, with said inlet port positioned above said outlet port and in an opposite side of said housing to cause a turbulence of gas flow, with the surface of said outer housing having a network of heat conducting fins emanating there-from into the exhaust gases and exteriorly of the housing.

an inner hollow housing located in the hollow of said housing and in thermal contact therewith, said inner housing containing a stacked array of stainless steel heat conductive turnings within said hollow to provide a spongelike mesh array and first and second fuel injectors coupled to the top wall of said inner chamber for introducing liquid fuel within the hollow of said inner chamber and output means formed by and adjoining said bottom wall of said inner chamber for directing vaporized fuel to the carburetor of said engine due to the force of gravity as the liquid fuel flows from the top of said inner chamber into said turnings and out to vaporize and flow to said carburetor via said output means.

* * * * *